United States Patent Office 3,516,693
Patented June 23, 1970

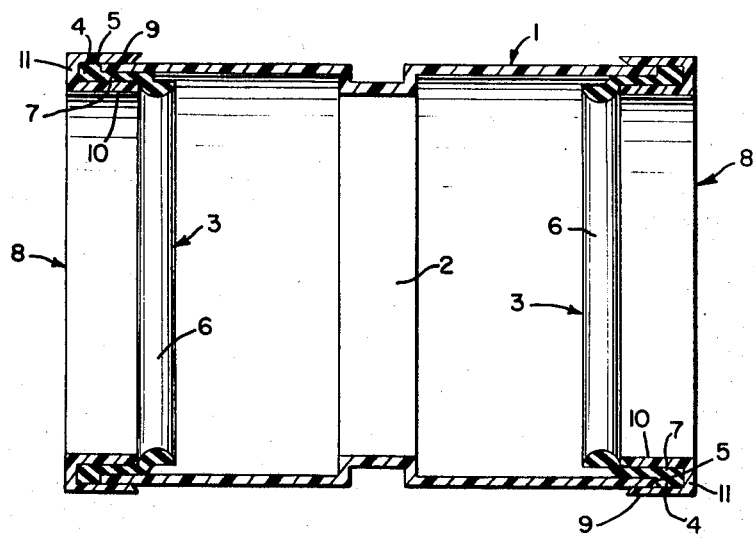

3,516,693
PIPE COUPLINGS
John Benjamin Glover, Stocksbridge, near Sheffield, England, assignor to The Hepworth Iron Company Limited
Filed Apr. 8, 1968, Ser. No. 719,409
Int. Cl. F16l *21/00*
U.S. Cl. 285—235  6 Claims

ABSTRACT OF THE DISCLOSURE

A synthetic plastic coupling sleeve for clayware, pitch-fibre, asbestos-cement or synthetic plastic plain-end pipes is provided at each end with a sealing ring having a radially-extending annular portion abutting the rim of the sleeve and an inwardly-projecting annular sealing head connected to the flange by an inner intermediate portion lying against the inside of the sleeve, held in place by a separate channel-section locking member gripping the sleeve.

---

This invention relates to pipe couplings and more particularly to coupling sleeves for plain-end pipes, e.g., of clayware, pitch-fibre, asbestos-cement or synthetic plastic material, such as are used in sewers, drains and cable conduit.

According to the present invention, a coupling for plain-end pipes comprises a slightly resilient synthetic plastic sleeve provided at each end with a sealing ring having a radially-extending annular flange abutting the rim of the sleeve and an inwardly-projecting annular sealing head connected to the flange by an intermediate portion lying against the inside of the sleeve, and a locking member consisting of a separate slightly resilient synthetic plastic ring of channel-section having its sides extending axially, with one side of the section preferably secured to the outside of the sleeve, with the other side of the section lying against the intermediate portion of the sealing ring, and with the base of the channel-section lying against the outwardly-extending annular flange of the sealing ring.

Thus both the sleeve and the locking rings are simple injection-mouldings, the sealing rings are simple mouldings readily located in the ends of the sleeve by the flanges, and the locking rings are easily fitted and secured to the sleeve to lock the sealing rings by their intermediate portions and flanges.

The sleeve may be provided at its midlength with one or more small integral internal projections or a flange or may be otherwise constricted internally to less than the outside diameter of pipe-lengths to which it is intended to be fitted, for facilitating location of the sleeve on a pipe-end to which it is first applied.

The axial thickness of the flange of each sealing ring is preferably greater than the radial thickness of the intermediate portion, so that it would be extremely unlikely that the flange would be pulled from its enclosure between the rim of the sleeve and the base of the locking ring. The intermediate portion of each sealing ring is preferably formed slightly thicker than the gap between the inside of the sleeve and the inner side of its locking ring, so that compression of the intermediate portion upon application of the locking ring increases the grip on the sealing ring. The inner side of each locking ring is preferably bevelled on the inside of the channel-section, to facilitate fitting of the locking ring, and the outer side of the locking ring may be bevelled likewise for the same purpose.

The sleeve and the locking rings are preferably formed of the same material, so that they may be secured together by solvent cement welding. Suitable materials for the sleeve and locking rings are modified or unmodified "rigid" polyvinyl chloride, polycarbonate, polyacetal, acrylonitrile butadiene styrene, and polypropylene, and a suitable material for the sealing rings is natural or synthetic rubber, e.g., butyl rubber, or a like elastomeric material.

The sealing head of each sealing ring preferably has a generally semicircular axial cross section, with the flatter side towards and spaced from the inside surface of the sleeve, and with one end of the section blending into the intermediate portion of the sealing ring.

One embodiment of the invention will now be described, by way of example only, with reference to the accompanying drawings, which is longitudinal sections of a sleeve coupling plain-end pipe-lengths (not shown).

The sleeve 1 is formed by injection-moulding synthetic plastic material, with a constriction 2 at its midlength for facilitating location of the sleeve on a pipe-end to which it is first applied. Each end of the sleeve is provided with a rubber sealing ring 3 having an outwardly-extending annular flange 4 abutting the rim 5 of the sleeve and an inwardly projecting annular sealing head 6 connected to the flange 4 by an intermediate portion 7 lying against the inside of the sleeve, and each sealing ring is held in place by a locking ring 8 of channel-section having its sides 9, 10 extending axially with the outer side 9 secured to the outside of the sleeve, as by solvent cement welding, with the inner side 10 lying against the intermediate portion 7 of the sealing ring, and with the base 11 of the channel-section lying against the flange 4 of the sealing ring. The head 6 of each sealing ring 3 is generally semicircular in axial section and spaced from the inside surface of the sleeve, so that sealing engagement with inserted pipe-ends results from distending of the sealing heads rather than compression of them.

The axial thickness of each flange 4 is greater than the radial thickness of the intermediate portion 7, so that it would be extremely unlikely that the flange would be pulled from its enclosure between the rim 5 of the sleeve and the base 11 of the locking ring. Each intermediate portion 7 is (as mentioned previously) preferably formed slightly thicker than the gap between the inside of the sleeve 1 and the inner side 10 of the locking ring 8, so that compression of the intermediate portion 7 upon application of the locking ring increases the grip on the sealing ring. Both sides 9, 10 of each locking ring 8 are bevelled on the inside of the channel-section, to facilitate fitting of the locking ring, especially with compression of the slightly thicker intermediate portion 7 of the locking rings.

What is claimed is:

1. A coupling for plain-end pipes comprising: a slightly resilient synthetic plastic sleeve; a sealing ring at each end of said sleeve; each said ring having an outwardly-extending annular flange portion abutting the respective rims of said sleeve, an inwardly-projecting annular sealing head connected to said flange by an intermediate portion lying against the inside of the sleeve; and a locking member solely securing each said sealing ring to said sleeve, said locking member consisting of a separate slightly resilient synthetic plastic ring of channel-section having its sides extending axially, with one side of the section lying directly against the outside of the sleeve and said flange portion, the other side of the section lying against said intermediate portion of said sealing ring, and the base of the channel-section lying against the outer end of said outwardly-extending annular flange of said sealing ring.

2. A pipe coupling as in claim 1, wherein said sealing head of each said sealing ring has a generally semicircular axial cross section, with the flatter side towards and spaced from the inside surface of the sleeve and with one end of the section blending into said intermediate portion of said sealing ring.

3. A pipe coupling as in claim 1, wherein each said locking member is secured to the outside of the sleeve.

4. A coupling as in claim 1, wherein the axial thickness of said flange of each said sealing ring is greater than the radial thickness of said intermediate portion.

5. A coupling as in claim 1, wherein said intermediate portion of each said sealing ring is formed slightly thicker than a gap maintained between the inside of the sleeve and the inner side of each said locking ring.

6. A coupling as in claim 1, wherein each said one and said other side of each said locking ring is bevelled toward the inside of the channel-section.

References Cited

UNITED STATES PATENTS

| 3,334,928 | 8/1967 | Schmunk | 258—110 |
| 3,368,830 | 2/1968 | French | 285—235 X |
| 3,400,954 | 9/1968 | Brown | 285—110 |

DAVID J. WILLIAMOWSKY, Primary Examiner

W. L. SHEDD, Assistant Examiner

U.S. Cl. X.R.

285—345, 369